United States Patent [19]
O'Reilly

[11] Patent Number: 5,160,610
[45] Date of Patent: Nov. 3, 1992

[54] RADIAL HEADER FOR DISSOLVED AIR FLOTATION SYSTEMS

[75] Inventor: David W. O'Reilly, Olathe, Kans.

[73] Assignee: Smith & Loveless, Inc., Lenexa, Kans.

[21] Appl. No.: 612,182

[22] Filed: Nov. 13, 1990

[51] Int. Cl.⁵ .................. C02F 1/24; B01D 17/035
[52] U.S. Cl. .................. 210/194; 210/195.1; 210/199; 210/221.2; 210/525; 210/528; 210/532.1; 209/170; 366/165; 417/171; 417/194
[58] Field of Search .......... 209/170; 210/703, 221.1, 210/221.2, 194, 199, 525, 528, 532.1; 195.1; 366/165; 417/194, 171

[56] References Cited

U.S. PATENT DOCUMENTS

| | | | |
|---|---|---|---|
| 2,653,801 | 9/1953 | Fontein | 366/165 |
| 3,207,485 | 9/1965 | Warren | 366/165 |
| 3,243,046 | 3/1966 | Kakumoto | 209/170 |
| 4,053,142 | 10/1977 | Johannes | 366/165 |
| 4,070,277 | 1/1978 | Uban et al. | 209/168 |
| 4,218,012 | 8/1980 | Hamza | 366/165 |
| 4,741,624 | 5/1988 | Barroyer | 366/165 |
| 4,842,777 | 6/1989 | Lamort | 209/170 |

FOREIGN PATENT DOCUMENTS

| | | | |
|---|---|---|---|
| 128144 | 8/1978 | Japan . | |
| 53-26462 | 11/1978 | Japan . | |
| 1373905 | 2/1988 | U.S.S.R. | 417/171 |
| 2145404 | 3/1985 | United Kingdom . | |

Primary Examiner—Stanley S. Silverman
Assistant Examiner—Thomas M. Lithgow
Attorney, Agent, or Firm—Dressler, Goldsmith, Shore, Sutker & Milnamow, Ltd.

[57] ABSTRACT

A radial mixing header for use with apparatus that removes solids from a liquid by dissolved air flotation (DAF). The header comprises a par of concentric pipes circumscribed by a concentric mixing chamber having a tangential port for introduction of the recycled gas-liquid stream thereinto. The recycled stream achieves rotary and turbulent motion and mixes in a larger diameter pipe with the raw solids-containing stream which flows through a smaller diameter pipe.

3 Claims, 3 Drawing Sheets

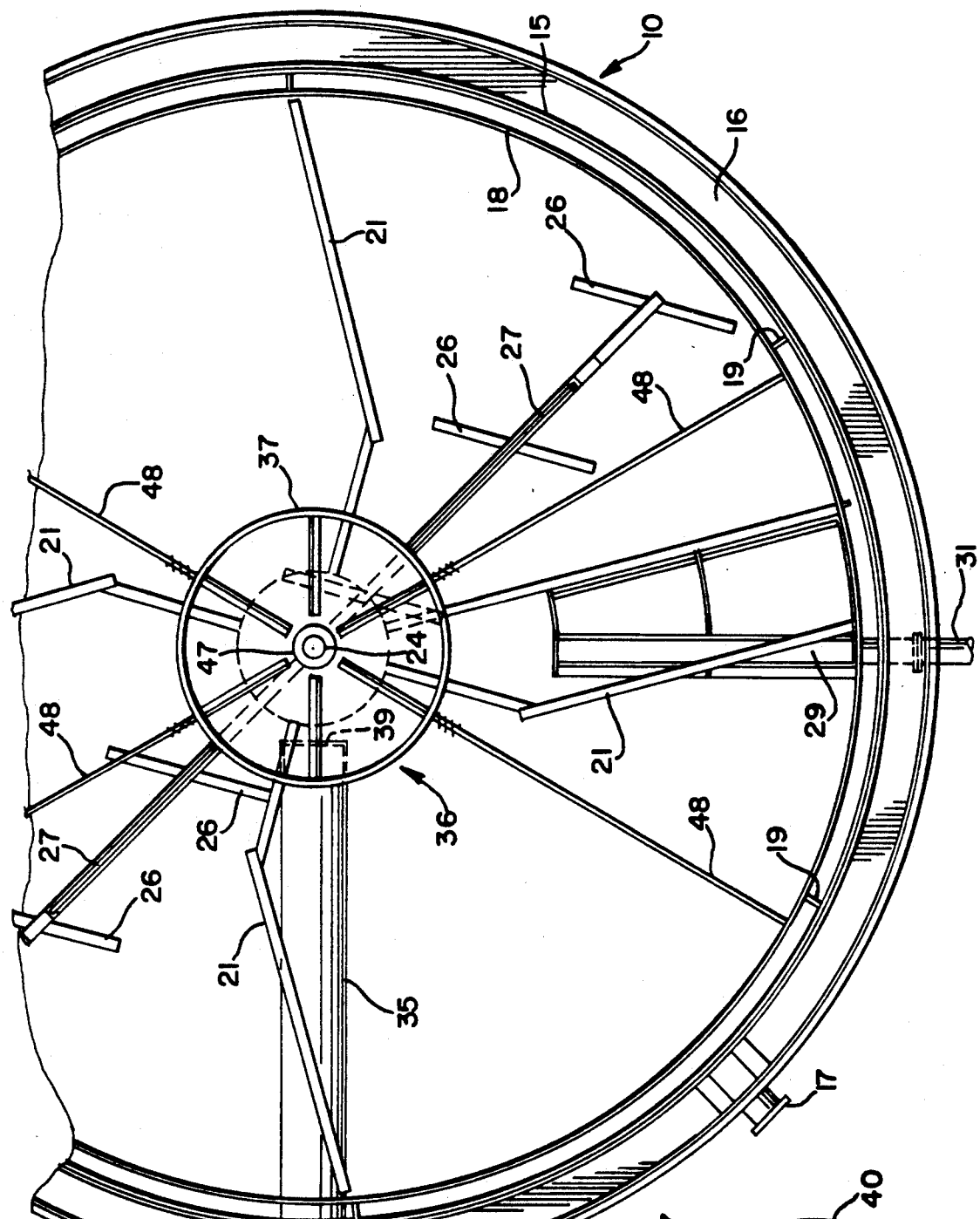

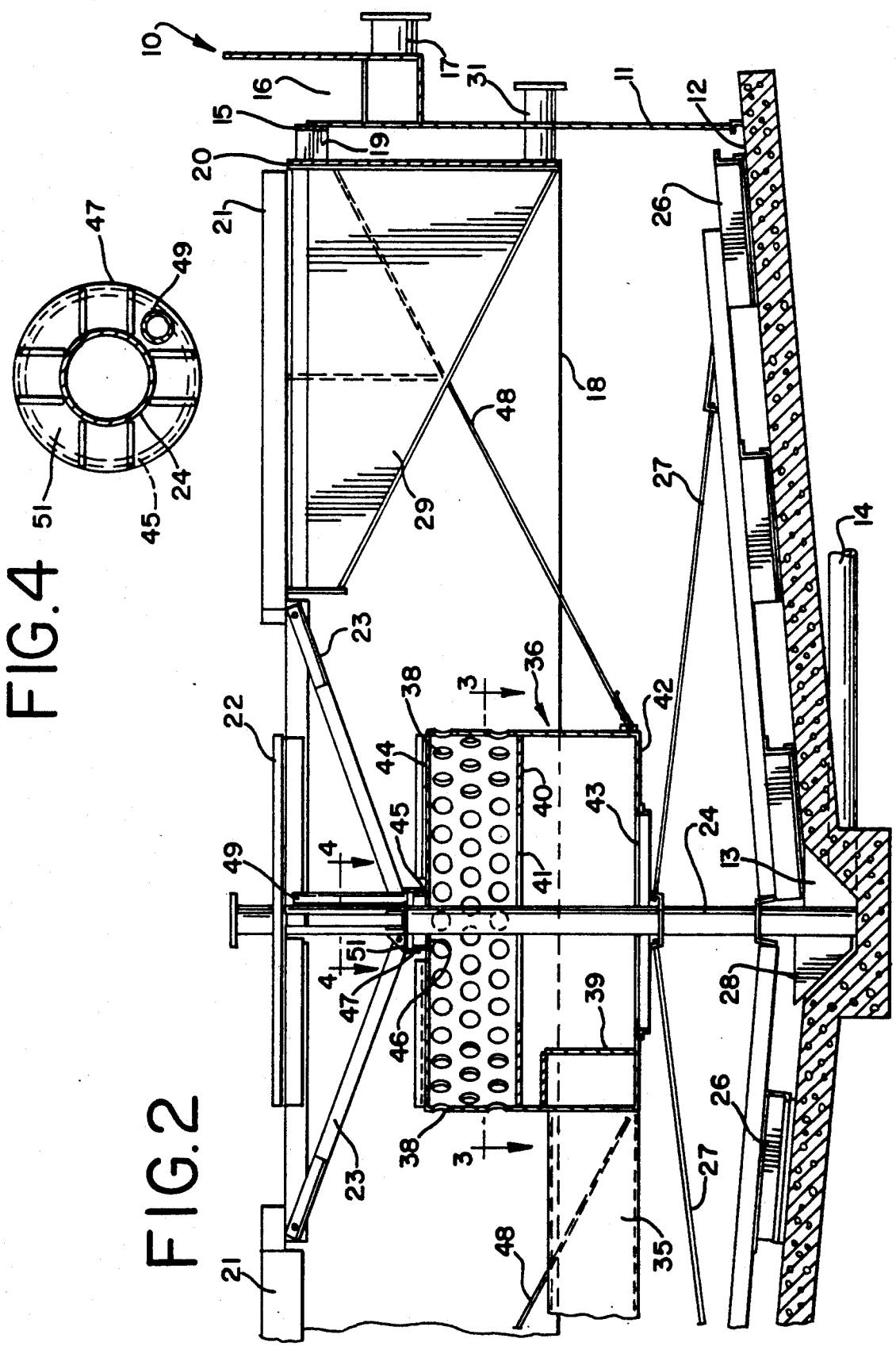

RADIAL HEADER FOR DISSOLVED AIR FLOTATION SYSTEMS

BACKGROUND OF THE INVENTION

This invention relates generally to dissolved air flotation (DAF) water clarifying systems and, more particularly to a liquid inlet structure for intimately mixing the recycle, or secondary, flow with the primary, or raw, flow at the start of the treatment process.

In wastewater treatment by dissolved air flotation, suspended solids particles adhere to or are entrapped by gas bubbles. Raw wastewater is fed into the flotation device and must be mixed with a recycle flow which is saturated with air and contains air bubbles. The efficiency of the system is directly dependent on the thoroughness of the mixing of the raw and secondary flows taking place at the start of the flotation process.

Prior flotation devices of the type described employed common "Y" or "T" fittings for the introduction and mixing of the two liquid streams. Typically, the raw wastewater was directed through a main pipe having a secondary inlet pipe attached directly thereto in the form of a "Y" or "T", and the recycle flow was introduced through the converging/secondary inlet pipe. It has been found that acceptably efficient mixing of the two liquid streams may not be achieved under normal low pressure operating conditions. While high liquid entry velocities tended to improve mixing, those conditions may result in undesirable liquid shear affecting flocculated solids commonly present in the raw waste stream.

There thus exists a need for a more efficient means of mixing the primary wastewater and secondary recycle flows of DAF treatment systems.

SUMMARY OF THE INVENTION

The present invention provides a liquid inlet structure or header for air flotation apparatus which more efficiently mixes the primary wastewater stream with the secondary dissolved air The invention thus comprises an improved radial distribution header for use in air flotation apparatus generally of the type shown in U.S. Pat. No. 4,070,277, which patent is assigned to the same assignee as the present invention.

Briefly, the invention comprises a cylindrical chamber concentric with and surrounding a central inlet pipe. The primary wastewater stream enters through the central pipe while the secondary recycle stream flows tangentially into the chamber. The central pipe comprises an exit port projecting into a wastewater main feed pipe of larger diameter than the central pipe. The main feed pipe is of smaller diameter than the chamber and comprises an inlet port for the recycle stream. Highly efficient mixing of the two streams takes place in the main feed or mixed flow pipe for improved results of the flotation system.

Turbulent or rotary flow of the recycle stream is caused in the cylindrical chamber as a result of the tangential entry of that stream thereinto. The stepped diameters of the pipes and ports promotes thorough mixing of the two streams within the mixed flow pipe. The novel radial header thereby achieves results not obtainable with the conventional simple convergent stream flow shown in the aforesaid '277 patent. Low entry velocities of the two streams may be utilized thereby preventing detrimental shearing of flocculated waste particles. Reverse flow of air and air saturated recycle water is also prevented during periods of low or no raw waste flow.

Numerous other features and advantages of the present invention will become apparent from the following detailed description of a preferred embodiment thereof, from the claims and from the accompanying drawings.

BRIEF DESCRIPTION OF THE DRAWINGS

In the accompanying drawings forming a part of the specification and in which like numerals are employed to designate like parts throughout the same:

FIG. 1 is a partially broken-away plan view of an exemplary DAF apparatus of the type shown in U.S. Pat. No. 4,070,277 incorporating the radial header of the invention;

FIG. 2 is a partially broken-away side elevation of the DAF apparatus shown in FIG. 1;

FIG. 3 is a plan view along the plane of line 3—3 in FIG. 2;

FIG. 4 is a plan view along the plane of line 4—4 in FIG. 2;

DETAILED DESCRIPTION OF THE INVENTION

Figure 7:
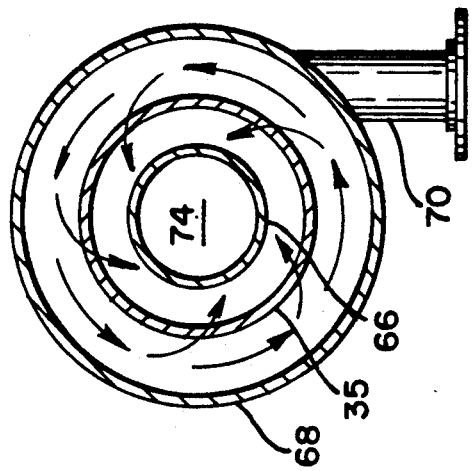
FIG. 7 is a cross-sectional view along the plane of line 7—7 in FIG. 5.

Referring with greater particularity to the various Figures of the drawings, there is shown an exemplary dissolved air flotation clarifier 10 for separating the solids from the liquid component of sewage or industrial waste by both sedimention and flotation. A cylindrical vessel 11 has a conical bottom 12 which slopes to a center depression 13. A first solids outlet conduit 14 communicates with depression 13 for removal of settled solids. An overflow weir defined by the upper edge 15 of vessel 11 controls the level of liquid in vessel 11, and collection trough 16 conveys clarified liquid to a liquid outlet conduit 17. A cylindrical scum baffle 18 is supported radially inwardly of vessel 11 by brackets 19. The upper edge 20 of baffle 18 extends above the surface of the liquid and thereby confines floatable solids within baffle 18.

A plurality of radially extending rotatable paddles 21 are schematically depicted in the drawing. Paddles 21 are attached to circular disc 22 and supported by struts 23. Disc 22 is attached to and rotates with a center torque shaft or tube 24. A plurality of bottom scraping rakes 26 are attached to torque tube 24 and supported by cables 27. Conventional motor means (not shown) slowly rotates torque tube 24 and this causes rakes 26 to scrape settled solids down bottom 12 to depression 13 where plows 28 attached to tube 24 further thicken the settled solids prior to removal in conventional manner through conduit 14. Rotation of paddles 21 forces floating solids adjacent the surface of the liquid into trough 29 from which they are removed through a second solids outlet conduit 31. Paddles 21 and trough 29 may be constructed and operated as disclosed in U.S. Pat. No. 3,919,090.

Floatable solids are carried toward the upper surface of the liquid in vessel 11 by bubbles formed by a gas-liquid mixture that is mixed with incoming solids-containing wastewater, the combined stream then flowing through a main inlet or mixed flow pipe 35. The gas-liquid mixture comprises the recycle or secondary flow and the raw wastewater comprises the primary flow as indicated by the flow arrows in FIG. 6.

The small bubbles are mixed with floatable solids to assure contact and then are dispersed when the mixture in conduit 35 is fed into a stationary center feedwell enclosure 36. Sidewall 37 of enclosure 36 has the shape of a right circular cylinder with tube 24 at its longitudinal centroidal axis. A plurality of perforations 38 are uniformly spaced around the upper half only of sidewall 37 below the upper surface thereof. A vertical baffle 39 disperses incoming solids, liquid and gas bubbles around the inside of enclosure 36 below a horizontal baffle 40 having a center opening 41. Relatively heavy solids are trapped in the lower chamber of enclosure 36 by baffle 40, while hole 41 permits rise of bubbles and fine solids into the perforated upper chamber. A bottom closure member in the form of a flat plate 42 perpendicular to the axis of enclosure 36 permits settling of the large solids through a circular opening 43 at its center. A plate 44, which may be flat or may be an inverted cone, spans the top of enclosure 36 so as to define a top closure member. An upstanding annular rim 45 on plate 44 defines a circular hole 46 in the center of plate 44. Hole 46 is closed by an inverted cup-shaped seal 47, which is secured to the outside of and rotates with torque tube 24. Seal 47 telescopes over rim 45 and has a sliding fit therewith. The bottom of enclosure 36 is held in place by cables 48 attached to baffle 18. The top of enclosure 36 is vented to the atmosphere through a pipe 49 having its lower end communicating with the inside of enclosure 36 through the horizontal surface 51 of seal 47 and its upper end extending above the surface of the liquid. Pipe 49 rotates with seal 47 thereby passing the pipe entrance opening over a constantly changing area of hole 46.

The bubbles in enclosure 36 can enter vessel 11 essentially only by passing through the perforations 38 in its upper half. The size of perforations 38, the diameter and height of wall 37 and the vertical location of enclosure 36 can be predetermined in relation to the volume of pressurized flow and raw waste leaving conduit 35 so as to produce a relatively uniform distribution of fine bubbles throughout the liquid within baffle 18. The volume of enclosure 36 should be sufficient to result in a minimum of 45 to 60 seconds of detention time for solids and bubbles therewithin. This will ensure that the turbulent flow in enclosure 36 will cause essentially all of the floatable solids to contact and adhere to small bubbles. The escaping bubbles will quickly carry to the surface for removal of the small solid particles that would be slow to settle to bottom 12. An excess of small bubbles should be produced so that solid particles which break up after leaving enclosure 36 are caught by the excess bubbles and carried to the surface. Inevitably, some large bubbles form in enclosure 36. These large bubbles rise immediately to the top of enclosure 36 where they migrate into hole 46 and out to the atmosphere through pipe 49. Rotation of pipe 49 around hole 46 prevents isolation of pockets of gas therewithin.

Figure 6:
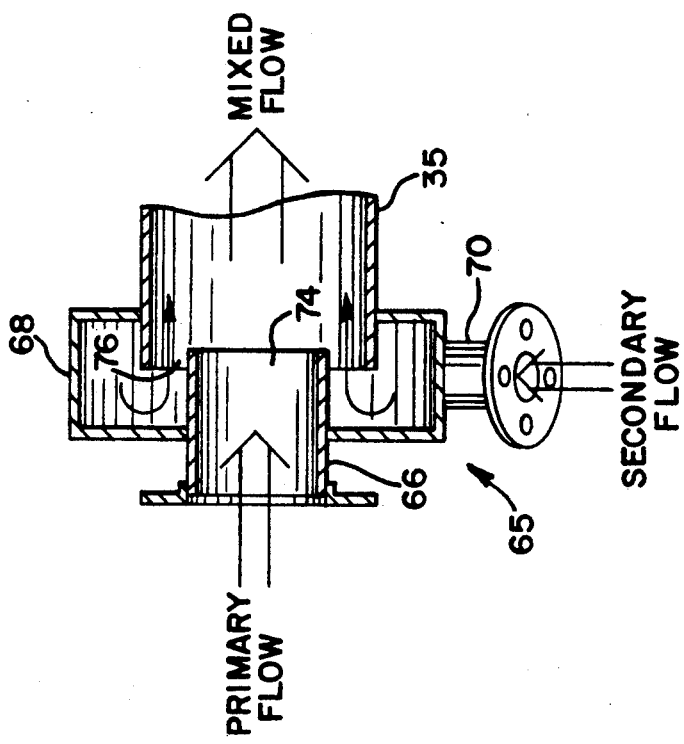
FIG. 6 is a vertical sectional view of the radial header shown in FIG. 5.
Figure 5:
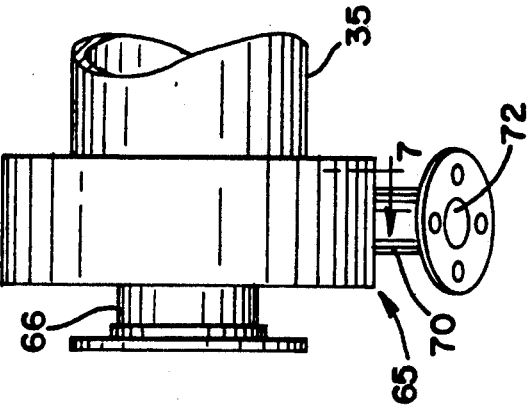
FIG. 5 is an enlarged side elevational view of the radial header of the invention.

Referring more particularly to FIGS. 5 through 7, it will be seen that the header 65 comprises a primary inlet pipe 66 and the main inlet or mixed flow pipe 35, the pipe 35 being of larger diameter than the pipe 66. A cylindrical chamber 68 of still larger diameter than the mixed flow pipe 35 is fixedly secured to the pipes 35 and 66 as by welding or the like. Cylindrical 68 comprises a tangential extension 70 providing a port 72 for introduction of the secondary stream thereinto. As seen best in FIG. 6, the primary inlet pipe 66 terminates forwardly or downstream in a port 74 and the mixed flow pipe 35 terminates rearwardly or upstream in a radial port 76, said ports being operationally positioned within the mixing chamber 68. Alternatively, the upstream end of the pipe 35 may lie in the plane of the vertical wall of the mixing chamber 68 and the pipe 66 elongated so that it projects into the pipe 35 in the same general relationship.

As indicated by the arrows in FIG. 7, the tangential introduction of the secondary flow stream into the chamber 68 causes rotary and turbulent flow so that the recycle stream is able to flow into the primary stream around a full 360 degrees thereof. It has been found that the described stepped arrangement of diameters and ports achieves more efficient mixing of the two streams than was hereto possible with conventional converging "Y" or "T" streams. In addition, such improved mixing has been achieved at substantially lower liquid velocities which prevent undesirable shearing of flocculated solids in the wastewater.

While the present invention has been described in combination with a particular DAF embodiment, it should be appreciated that the description is for illustrative purposes only and it is intended for use in combination with other known DAF embodiments. The concentric pipes 35 and 66 and chamber 68 could be of other geometric forms than the cylindrical configuration illustrated. It should also be appreciated that the words used are words of description rather than limitation, and various changes may be made by those skilled in the art without departing from the spirit and scope of the invention which is defined in the appended claims.

What is claimed is:

1. In combination with a dissolved air flotation apparatus means for separating solids from liquids, a distribution header for feeding a mixture of a recycled gas-liquid stream and a raw solids-containing liquid stream, said distribution header comprising:

a cylindrical primary inlet pipe means for carrying the raw solids-containing stream;

a cylindrical mixed flow pipe means for carrying a mixture of the recycled gas-liquid stream and the raw solids-containing liquid stream into the dissolved air flotation apparatus means, said mixed flow pipe means being of larger diameter than the primary inlet pipe means;

a chamber means secured to said primary inlet pipe means and said mixed flow pipe means in substantially concentric relationship to said primary inlet pipe means and said mixed flow pipe means, said chamber being of larger diameter than said mixed flow pipe means; and tangential port means for introducing the recycled gas-liquid stream tangentially into said chamber means whereby the gas-liquid stream introduced into said mixing chamber means achieves rotary and turbulent motion so that the gas-liquid stream and the raw solids-containing liquid stream are mixed in said mixed flow pipe means.

2. The invention as defined in claim 1 wherein the downstream end of said primary inlet pipe means is operationally positioned inwardly of the upstream end of said mixed flow pipe means, whereby said gas-liquid stream mixes with said solids-containing liquid stream around approximately 360 degrees.

3. The invention as defined in claim 2 wherein both said pipe ends are positioned within said chamber means.

* * * * *